US010260931B2

(12) United States Patent
Acheson et al.

(10) Patent No.: US 10,260,931 B2
(45) Date of Patent: *Apr. 16, 2019

(54) MULTI-VARIABLE YIELD MONITOR AND METHODS FOR THE SAME

(71) Applicant: Raven Industries, Inc., Sioux Falls, SD (US)

(72) Inventors: John Earl Acheson, Sioux Falls, SD (US); Stephen Filip Fjelstad, Worthing, SD (US); Douglas Samuel Prairie, Sioux Falls, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 139 days.

This patent is subject to a terminal disclaimer.

(21) Appl. No.: 15/174,686

(22) Filed: Jun. 6, 2016

(65) Prior Publication Data

US 2016/0282171 A1 Sep. 29, 2016

Related U.S. Application Data

(62) Division of application No. 13/835,054, filed on Mar. 15, 2013, now Pat. No. 9,410,840.

(51) Int. Cl.
*G01F 13/00* (2006.01)
*A01D 41/127* (2006.01)
(Continued)

(52) U.S. Cl.
CPC ......... *G01G 11/003* (2013.01); *A01D 41/127* (2013.01); *A01D 41/1272* (2013.01);
(Continued)

(58) Field of Classification Search
CPC ...... G01G 11/003; G01G 11/04; G01G 19/12; G01G 21/23; G01F 13/003; A01D 41/127;
(Continued)

(56) References Cited

U.S. PATENT DOCUMENTS

| 4,376,298 A | 3/1983 | Sokol et al. |
| 5,092,819 A | 3/1992 | Schroeder et al. |

(Continued)

FOREIGN PATENT DOCUMENTS

| DE | 112014001474 T5 | 11/2015 |
| DE | 112014001439 T5 | 1/2016 |

(Continued)

OTHER PUBLICATIONS

US 9,274,074 B2, 03/2016, Acheson et al. (withdrawn)

(Continued)

*Primary Examiner* — Randy Gibson
(74) *Attorney, Agent, or Firm* — Schwegman Lundberg & Woessner, P.A.

(57) ABSTRACT

A dynamic yield monitor system includes a plurality of instruments to measure harvested crop characteristics while a crop is in-flow within a harvester elevator. The system includes a volume instrument that measures a harvested crop volume from the in-flow harvested crop within the harvester elevator, and a weight instrument that measures a harvested crop weight from the in-flow harvested crop within the harvester elevator. Optionally, the system includes other instruments including a moisture and temperature instrument. A receiver and processing node communicates with the instrument. The receiver and processing determines variable harvested crop test weight based on at least the measured harvested crop volume and measured harvested crop weight of the in-flow crop. The receiver and processing node further determines a variable yield of the harvested crop based on the measured harvested crop volume, the measured harvested crop weight, and the variable harvested crop test weight.

30 Claims, 8 Drawing Sheets

(51) Int. Cl.
*G01G 11/04* (2006.01)
*G01G 19/12* (2006.01)
*G01G 11/00* (2006.01)
*G01G 21/23* (2006.01)
*A01D 61/02* (2006.01)

(52) U.S. Cl.
CPC ........... *A01D 61/02* (2013.01); *G01F 13/003* (2013.01); *G01G 11/04* (2013.01); *G01G 19/12* (2013.01); *G01G 21/23* (2013.01); *A01D 41/1271* (2013.01); *A01D 41/1277* (2013.01)

(58) Field of Classification Search
CPC ................ A01D 41/1272; A01D 61/02; A01D 41/1271; A01D 41/1277
See application file for complete search history.

(56) References Cited

U.S. PATENT DOCUMENTS

| | | | |
|---|---|---|---|
| 5,106,339 A | 4/1992 | Braun et al. | |
| 5,343,761 A | 9/1994 | Myers | |
| 5,351,558 A | 10/1994 | Horn et al. | |
| 5,561,250 A | 10/1996 | Myers | |
| 5,611,420 A | 3/1997 | Heim et al. | |
| 5,685,772 A | 11/1997 | Andersen et al. | |
| 5,686,671 A | 11/1997 | Nelson et al. | |
| 5,700,961 A | 12/1997 | Anthony et al. | |
| 5,750,877 A | 5/1998 | Behnke et al. | |
| 5,863,247 A | 1/1999 | Behnke et al. | |
| 5,957,773 A | 9/1999 | Olmsted et al. | |
| 5,959,257 A | 9/1999 | Campbell et al. | |
| 6,073,427 A | 6/2000 | Nichols | |
| 6,121,782 A | 9/2000 | Adams et al. | |
| 6,138,518 A | 10/2000 | Strubbe | |
| 6,192,664 B1 | 2/2001 | Missotten et al. | |
| 6,244,782 B1 | 6/2001 | Bitelli | |
| 6,272,935 B1 | 8/2001 | Strubbe | |
| 6,282,967 B1 | 9/2001 | Homburg et al. | |
| 6,283,853 B1 | 9/2001 | Pellenc et al. | |
| 6,285,198 B1 | 9/2001 | Nelson et al. | |
| 6,313,414 B1 | 11/2001 | Campbell | |
| 6,327,899 B1 | 12/2001 | Diekhans et al. | |
| 6,460,008 B1 | 10/2002 | Hardt | |
| 6,508,049 B1 | 1/2003 | Cox et al. | |
| 6,525,276 B1 | 2/2003 | Vellidus et al. | |
| 6,584,424 B2 | 6/2003 | Hardt | |
| 6,616,527 B2 | 9/2003 | Shinners et al. | |
| 6,669,557 B2 | 12/2003 | Adams et al. | |
| 6,899,616 B1 | 5/2005 | Murray et al. | |
| 6,951,514 B1 | 10/2005 | Coers et al. | |
| 7,340,996 B1 | 3/2008 | Viaud | |
| 7,412,905 B1 | 8/2008 | Bishel | |
| 7,500,280 B2 | 3/2009 | Dixon et al. | |
| 9,372,109 B2 * | 6/2016 | Acheson | G01G 11/003 |
| 9,410,840 B2 * | 8/2016 | Acheson | A01D 41/1272 |
| 9,506,786 B2 * | 11/2016 | Strnad | A01D 41/1272 |
| 10,028,435 B2 * | 7/2018 | Anderson | A01D 41/1272 |
| 2002/0133309 A1 | 9/2002 | Hardt | |
| 2003/0033862 A1 | 2/2003 | Mcelhaney et al. | |
| 2005/0225334 A1 | 10/2005 | Rains et al. | |
| 2007/0050116 A1 | 3/2007 | Jernigan | |
| 2009/0007709 A1 | 1/2009 | Sugita et al. | |
| 2011/0209925 A1 | 9/2011 | Rossi | |
| 2012/0004815 A1 | 1/2012 | Behnke | |
| 2012/0253760 A1 | 10/2012 | Zielke | |
| 2013/0000393 A1 | 1/2013 | Cash et al. | |
| 2013/0317696 A1 | 11/2013 | Koch et al. | |
| 2014/0174199 A1 | 6/2014 | Strnad et al. | |
| 2014/0216894 A1 | 8/2014 | Fourney | |
| 2014/0236381 A1 | 8/2014 | Anderson et al. | |
| 2014/0262547 A1 | 9/2014 | Acheson et al. | |
| 2014/0262548 A1 | 9/2014 | Acheson et al. | |
| 2014/0266253 A1 | 9/2014 | Acheson et al. | |

FOREIGN PATENT DOCUMENTS

| | | |
|---|---|---|
| EP | 0960557 A1 | 12/1999 |
| EP | 0960558 B1 | 4/2003 |
| WO | WO-2013023142 A1 | 2/2013 |
| WO | WO-2013028378 A3 | 2/2013 |
| WO | WO-2014143759 A1 | 9/2014 |
| WO | WO-2014149675 A1 | 9/2014 |
| WO | WO-2014151025 A2 | 9/2014 |
| WO | WO-2014151025 A3 | 9/2014 |

OTHER PUBLICATIONS

"Precision Planting YieldSense", [online]. Retrieved from the Internet: <URL: http://www.precisionplanting.com/#products/yieldsense/, (Published Prior to Mar. 15, 2013), 6 pgs.

"Raven SmartYield Pro", [online]. Retrieved from the Internet: <URL: http://ravenprecision.com/products/harvest-controls/smartyield-pro/>, (Published Prior to Mar. 15, 2013), 3 pgs.

"Trimble Yield Monitoring", [online], Retrieved from the Internet: <URL: http://www.trimble.com/Agriculture/yield-monitoring.aspx>, (Published Prior to Mar. 15, 2013), 4 pgs.

"Weights Measures, and Conversion Factors for Agricultural Commodities and Their Porducts", United States Department of Agriculture, Economic Research Service, Agricultural Handbook No. 697, Supersedes SB-616, Conversion Factors and Weights and Measure for Agricultural Commodities and Their Products, 1979, (1979), 77.

Beuerlein, Jim, "Bushels, Test Weights and Calculations", The Ohio State University FactSheet, Department of Horticulture and Crop Science, 2021 Coffey Road, Columbus, Ohio 43210-1044, ohioline.ag.ohio-state.edu—your Link to Information, News, and Education; http://ohioline.osu.edu/agf-fact/0503.html, (Jul. 2, 2015), 2.

* cited by examiner

FIG. 8

| ZONE | VOLUME (IN³/SEC) | WEIGHT (LBM/SEC) | TEST WEIGHT (IN³/LBM*SEC) F(VOLUME, WEIGHT) | MOISTURE CONTENT (PERCENTAGE) | TEMPERATURE (DEGREES F) | BUSHELS (PER SEC) | BUSHELS TOTAL |
|---|---|---|---|---|---|---|---|
| $Z_1$ | $V_1$ | $W_1$ | $TW_1$ | $MC_1$ | $T_1$ | $B_1$ | $BT_1$ |
| $Z_2$ | $V_2$ | $W_2$ | $TW_2$ | $MC_2$ | $T_2$ | $B_2$ | $BT_2$ |
| $Z_3$ | $V_3$ | $W_3$ | $TW_3$ | $MC_3$ | $T_3$ | $B_3$ | $BT_3$ |
| $Z_4$ | $V_4$ | $W_4$ | $TW_4$ | $MC_4$ | $T_4$ | $B_4$ | $BT_4$ |
| $Z_5$ | $V_5$ | $W_5$ | $TW_5$ | $MC_5$ | $T_5$ | $B_5$ | $BT_5$ |
| $Z_6$ | $V_6$ | $W_6$ | $TW_6$ | $MC_6$ | $T_6$ | $B_6$ | $BT_6$ |
| $Z_7$ | $V_7$ | $W_7$ | $TW_7$ | $MC_7$ | $T_7$ | $B_7$ | $BT_7$ |
| $Z_8$ | $V_8$ | $W_8$ | $TW_8$ | $MC_8$ | $T_8$ | $B_8$ | $BT_8$ |
| $Z_9$ | $V_9$ | $W_9$ | $TW_9$ | $MC_9$ | $T_9$ | $B_9$ | $BT_9$ |
| $Z_{10}$ | $V_{10}$ | $W_{10}$ | $TW_{10}$ | $MC_{10}$ | $T_{10}$ | $B_{10}$ | $BT_{10}$ |
| $Z_{n+10}$ | $V_{n+10}$ | $W_{n+10}$ | $TW_{n+10}$ | $MC_{n+10}$ | $T_{n+10}$ | $B_{n+10}$ | $BT_{n+10}$ |

MULTI-VARIABLE YIELD MONITOR AND METHODS FOR THE SAME

CROSS-REFERENCE TO RELATED PATENT DOCUMENTS

This application is a continuation of U.S. patent application Ser. No. 13/835,054, filed Mar. 15, 2013, which application is incorporated herein by reference.

This patent application is related to U.S. patent application entitled "REMOTE MOISTURE SENSOR AND METHODS FOR THE SAME"; filed on an even date herewith, and incorporated herein by reference.

This patent application is also related to U.S. patent application entitled "IN-FLOW WEIGHT SENSOR AND METHODS FOR THE SAME"; filed on an even date herewith, and incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Raven Industries, Inc.; Sioux Falls, S. Dak. All Rights Reserved.

TECHNICAL FIELD

This document pertains generally, but not by way of limitation, to systems and methods of determining crop yields.

BACKGROUND

Yield monitor systems are used to measure crop yields during harvesting. Yield characteristics, such as weight or volume, are used to assess the quality and quantity of a crop and accordingly determine its purchase price. In one example a yield equation that assesses the quality and quantity of a crop is based on four distinct variables and a fifth related variable. In one example, the four variables include volume, temperature, moisture and test weight (density) of the harvested crop. The fifth related variable is the weight of the harvested crop, and with at least some yield monitors the weight is determined according to the volume and test weight.

One example of a type of yield monitor is a volume based yield monitor. With volume based yield monitors a volume sensor is provided in a harvester elevator that measures the volume of a harvested crop within the elevator. The operator of the harvester inputs a test weight (density) assumption for the harvested crop in a field based on the observed field conditions, the crop being harvested, as well as the experience of the operator. The weight is derived from the volume measured and the assumed test weight.

Another example of a type of yield monitor is a weight based yield monitor that uses a weight sensor to measure the weight of a harvested crop. With weight based yield monitors the four variables include weight, temperature, moisture and the test weight of the harvested crop. In contrast to the volume based yield monitor, the weight based yield monitor determines the volume of the harvested crop according to the test weight and the weight. Similar to the volume based yield monitor, an operator of the weight based yield monitor assumes a test weight for a field and inputs the assumed test weight. As discussed above, the assumed test weight and the measured weight are used to determine the volume of the harvested crop.

OVERVIEW

The present inventors have recognized, among other things, that a problem to be solved can include the minimizing of error introduced by assumptions into yield values. In an example, the present subject matter can provide a solution to this problem, such as by a system or method that determines yield values based on measured harvested crop characteristics. Stated another way, operator assumptions of characteristics, such as a test weight value are entirely avoided.

In one example, the systems or methods described herein measure both volume and weight and the test weight for a harvested crop is determined based on these measured characteristics. Accordingly, the generation of one or more harvested crop yield values is based on measured (as opposed to one or more assumed) characteristic values including the test weight (determined by the measured characteristic values). Further still, each of the measured characteristics and the corresponding yield values vary dynamically according to the measurements of the instruments associated with a harvester elevator.

The present inventors have further recognized, that a problem to be solved can include increasing the resolution of harvested crop yield values within a field. As discussed above, in at least some yield monitors a test weight value is assumed for a particular field and input to the yield monitor for use in yield calculations. The corresponding yield calculations are thereby accordingly consistently based on the same assumed test weight value within the field even though in practice the test weight will vary within the field, sometimes widely.

In another example, the systems or methods described herein address this problem by dynamically measuring each of the one or more harvested crop characteristics including, but not limited to, harvested crop volume and weight. As discussed above, the test weight is determined from these measurements. Accordingly, the test weight dynamically varies according to actual measured characteristics for a harvested crop as it is harvested from various locations of the field. Because the test weight dynamically changes along with the measured harvested crop characteristics, the corresponding harvested crop yield values dynamically change according to the location of the harvester within the field. Yield maps generated with these dynamically changing values (measured characteristics and determined test weight) accordingly provide enhanced resolution relative to previous yield maps that use a consistent assumed test weight for the field. High resolution yield maps based on dynamic changes as opposed to consistent static assumptions decrease error in yield calculations, for instance to one percent or less. Further, high resolution yield maps are valuable to an operator as accurate yield values are indexed to specific locations in the field, thereby facilitating improved husbandry and planting in future seasons (e.g., varied hybrid planting within portions of the field, varied agricultural product application, watering and the like).

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 8 is an array of harvested crop characteristic measurements and yield values associated with corresponding locations of the field of FIG. 7.

DETAILED DESCRIPTION

Figure 1:
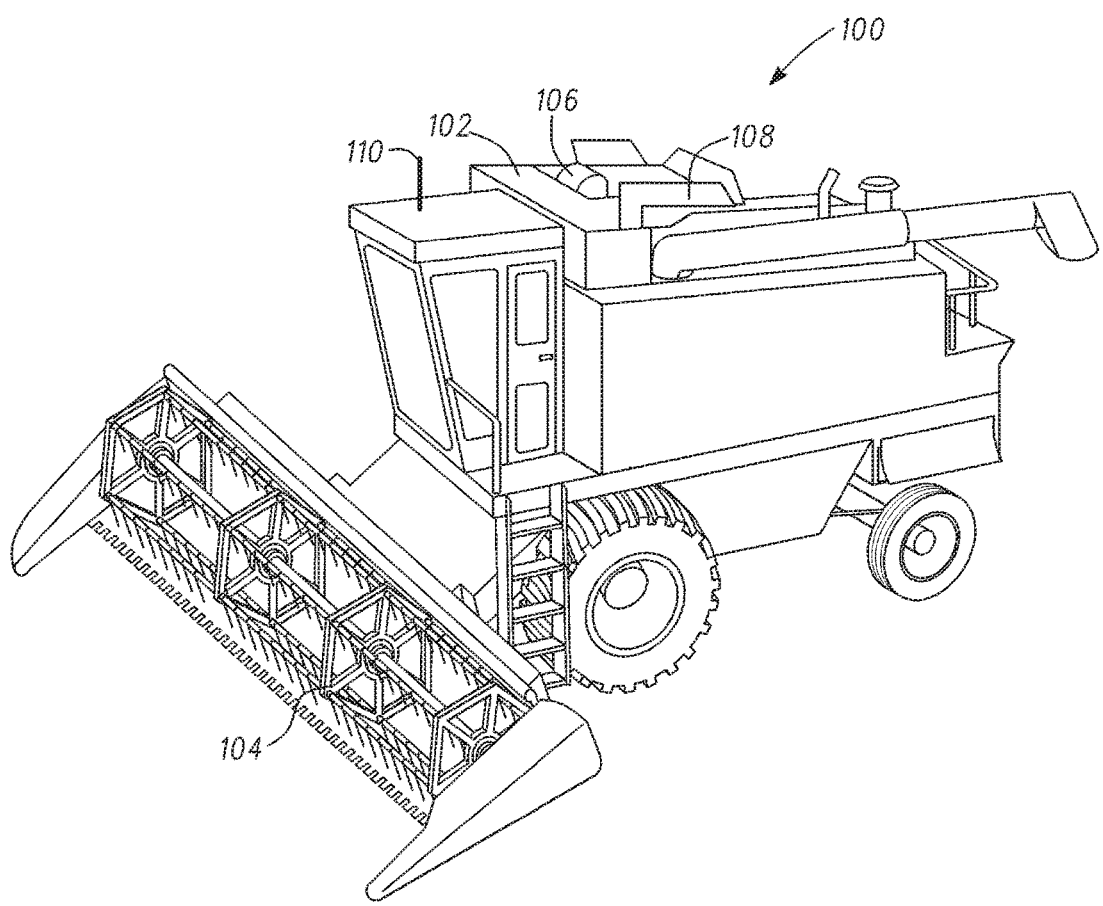
FIG. 1 is a perspective view of one example of a harvester.

FIG. 1 shows one example of a harvester, such as a harvester combine 100. As shown the harvester 100 includes a body 102 and a header 104 movably coupled with the body 102. In one example, the header 104 is used to cut and divide grain such as crops and deliver the grain into the body 102 for further processing. Referring again to FIG. 1, in one example the harvester 100 includes a harvester elevator 106 configured to remove processed grain for instance from the internal mechanisms of the harvester 100 and deposit the grain within a grain tank 108. As further shown in FIG. 1 an antenna, such as a GPS antenna 110, is further provided on the body 102 to provide accurate position data of the harvester 100 for instance while harvesting within a field.

As previously described, the harvester 100 includes a harvester elevator 106 configured to deliver grain from processing into a grain tank 108. As will be described herein, the harvester elevator 106 includes one or more instruments (e.g., a suite of instruments) as well as a receiver and processing node configured to measure one or more characteristics, such as harvested crop characteristics of a crop delivered through the harvest elevator 106 to the grain tank 108. As will be further described herein, the dynamic yield monitor system provided herein is configured to use each of four representative harvested crop characteristics used in standard yield equations to determine one or more variable yield values of the crop at it is harvested from a field. The dynamic yield monitor system is configured to determine each of these crop characteristics in a dynamic fashion, for instance as the harvester 100 is harvesting the crop within a field. Accordingly, assumptions of particular crop characteristics, such as test weight (density) and one or more related characteristics, such as weight or volume are avoided. Stated another way, the dynamic yield monitor system described herein is able to dynamically determine each of the harvested crop characteristics and accurately determine one or more variable yield values without user inputted assumptions, for instance regarding test weight or the like.

Although the systems and methods described herein are shown in the context of an exemplary harvester 100, the disclosure is not limited to harvesters 100. Instead, the systems and methods are applicable to any system (whether static or moving) that would benefit from accurate crop characteristic measurements of an in-flow crop. For instance, the systems and methods described herein are used with, but not limited to, stationary harvesters, elevators, crop picking systems (e.g., fruit and apple picking systems) and the like.

Figure 2A:
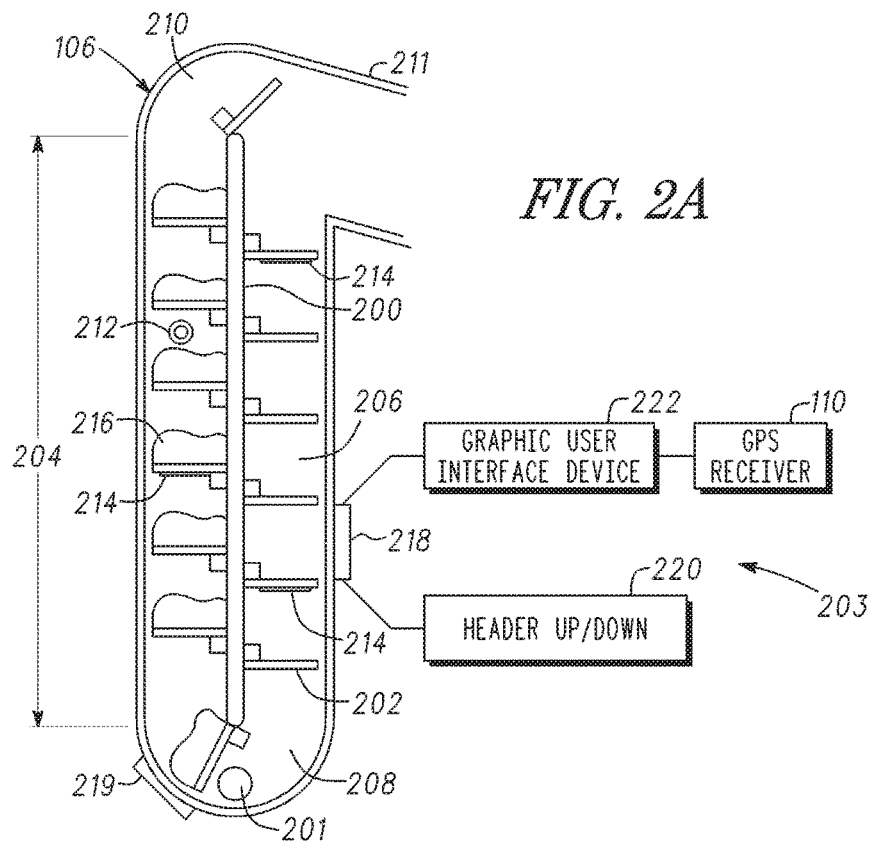
FIG. 2 is a schematic diagram of one example of a harvester elevator including a dynamic yield monitor system.

Referring now to FIG. 2A, one example of the harvester elevator 106 previously shown in FIG. 1 is provided. In the schematic view provided in FIG. 2A an elevator loop 200 is shown extending through the harvester elevator 106. The elevator loop 200 includes a plurality of paddles 202 arranged in a linear configuration that cyclically move within descending and ascending segments 206, 204. During the descending segment 206 the paddles 202 move without a harvested crop and engage with a harvested crop for instance at a trough segment 208. The harvested crop is in one example supplied through a supply auger 201 and is immediately engaged by one or more of the paddles 202 as the paddles move through the trough segment 208. The harvested crop (e.g., a quantity of harvested crop 216) as shown in FIG. 2A is elevated along an ascending segment 204 of the harvester elevator 106. In one example, the quantity of harvested crop 216 on each of the paddles 202 is substantially static relative to the paddles 202 as it ascends. That is to say the paddle 202 and the quantity of harvested crop 216 on the respective paddle are substantially static relative to one another while the composite of the quantity of the harvested crop 216 and the paddle 202 are otherwise moving within the ascending segment 204 toward an apex segment 210. The quantity of harvested crop 216 is elevated to the apex segment 210 as previously described and delivered through a crop chute 211 for instance to the grain tank 108.

As further shown in FIG. 2A, one example of a dynamic yield monitor system 203 is provided. In the example shown, the dynamic yield monitor system 203 includes one or more instruments or a plurality of instruments (e.g., a suite of instruments) configured to determine one or more harvested crop characteristics dynamically, for instance as the harvester 100 is harvesting the crop within a field and the harvested crop flows through the harvester elevator 106. In the example shown the dynamic yield monitor system 203 includes a volume instrument 212 and a separate weight instrument 214. In the example shown in FIG. 2A the weight instrument 214 is associated with one or more of the paddles 202. Stated another way, the weight instrument 214 is installed on one of the paddles 202 (and alternatively a plurality of paddles of the total number of paddles of the elevator loop 200).

As further shown in the dynamic yield monitor system 203 example, the system further includes a moisture and temperature instrument 219 positioned for instance within a portion of the trough segment 208. The moisture and temperature instrument 219 is configured to measure the moisture content as well as the temperature of the harvested grain as it enters the harvester elevator 106 for instance immediately before and during engagement and lifting by one or more of the paddles 202. In still another example, the dynamic yield monitor system 203 includes a header orientation instrument 220. The header orientation instrument 220 is coupled with the header, such as the header 104 shown in FIG. 1. The header orientation instrument 220 is sized and shaped to determine the orientation of the header 104, for instance while the header 104 is in a down position and accordingly harvesting the crop in the field and while the header is in an up position where the header 104 is disengaged and accordingly no longer harvesting the crop. As will be described herein, in one example the header orientation instrument 220 is associated with the antenna 110 to accordingly index the location of the harvester 100 and the corresponding orientation of the header 104 (whether up or down) with that corresponding position.

As further shown in FIG. 2A, in another example the dynamic yield monitor system 203 includes a receiver and processing node 218. The receiver and processing node 218 in one example serves as the nexus or communal node for each of the instruments of the suite of instruments including for instance the volume instrument 212, the weight instrument 214, the moisture and temperature instrument 219 and the header orientation instrument 220. In another example, the receiver and processing node 218 and the corresponding dynamic yield monitor system 203 include one or more of the instruments provided herein for the instrument suite. For instance, the dynamic yield monitor system 203 includes a volume instrument 212 in combination with the moisture and temperature instrument 219 and the header orientation instrument 220 or the weight instrument 214 in combination with the moisture and temperature instrument 219 and the header orientation instrument 220.

As further shown in FIG. 2A, in one example the receiver and processing node 218 is in communication with the antenna, such as the antenna 110 previously shown in FIG. 1. Accordingly, any of the crop characteristics measured with one or more of the volume instrument 212, the weight instrument 214 and the moisture and temperature instrument 219 are associated with the position of the harvester 100 as will be further described herein. Additionally, the cooperation between the antenna 110, the receiver and processing node 218 and one or more of the instruments described herein are used to accordingly determine one or more harvested crop characteristics and associate those crop characteristics with a particular position within a field. Stated another way, the dynamic yield monitor system 203 dynamically measures the variable crop characteristics, for instance with any of the instruments previously described herein, and associates the according crop characteristics as well as yield values determined with those crop characteristics with the corresponding location on a map, for instance a yield map. By blending this information for instance with the receiver and processing node 218 a dynamic map of one or more harvested crop characteristics as well as yield values corresponding to one or more field locations (and varying at those locations according to the measured characteristics) is accordingly produced.

In another example the dynamic yield monitor system 203 includes a graphical user interface (GUI) 222 configured to allow user input from an operator. For instance the operator is able to initiate one or more of calibration, diagnostics and review the instrument measurements and variable yield values communicated to and delivered from the receiver and processing node 218, for instance while the harvester 100 is in a harvesting operation within a field.

Referring again to FIG. 2A as previously described herein, the dynamic yield monitor system 203 includes a suite of instruments configured to determine each of four variables used in yield calculations. The suite of instruments, for instance the volume instrument 212, the weight instrument 214 and the moisture and temperature instrument 219, are provided within the harvester elevator 106 and are accordingly operable to measure the harvested crop in-flow. That is to say, the plurality of instruments are configured to dynamically measure characteristics of a quantity of harvested crop delivered through the harvester elevator 106 at a particular time (e.g., continuously measure the characteristics of the in-flow crop). Accordingly, the instruments 212, 214, 219 dynamically measure the various harvested crop characteristics as those characteristics change, for instance as the harvester 100 moves through different areas of the field having varying production (e.g., yield) of a particular harvested crop. That is to say, the suite of instruments including the volume instrument 212, the weight instrument 214 and the moisture and temperature instrument 219 are able to dynamically measure crop characteristics of an in-flow crop moving through the harvester elevator 106. Accordingly, as crop characteristics change throughout the field the instruments 212, 214, 219 in cooperation with the receiver and processing node 218 are able to measure and log the corresponding crop characteristics. Additionally, the dynamic yield monitor system 203 (e.g., through the receiver and processing node 218) is accordingly able to generate one or more dynamic variable yield values of the harvested crop according to these dynamically determined crop characteristics.

Figure 2B:
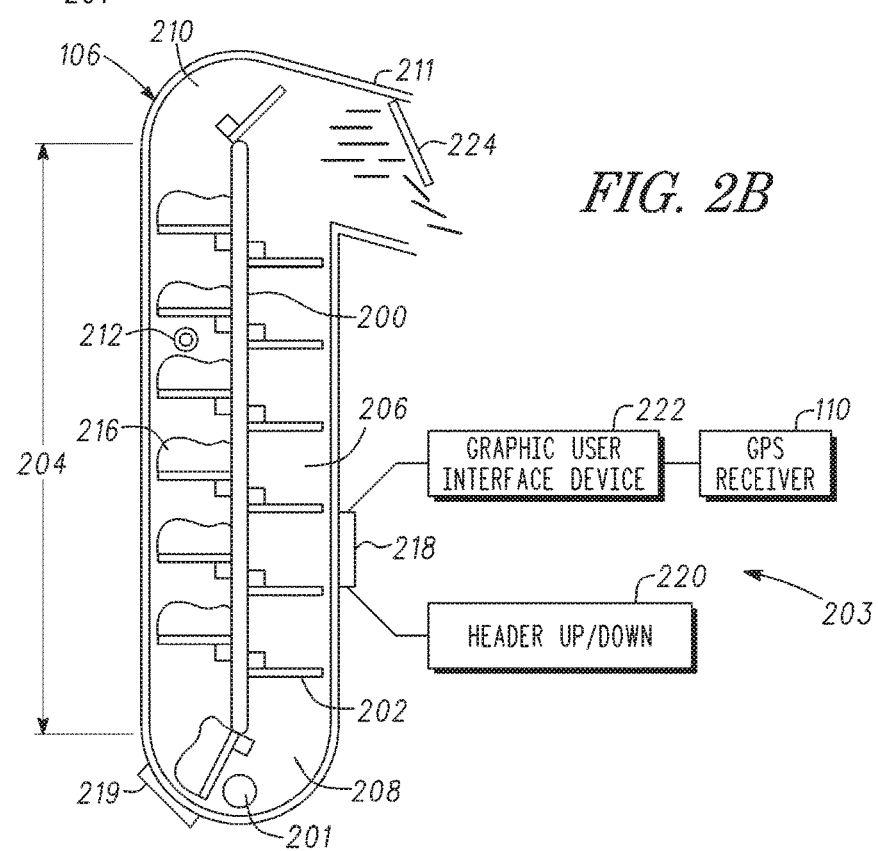

Referring now to FIG. 2B, another example of a dynamic yield monitor system 205 is provided. As shown, the dynamic yield monitor system 205 includes a plurality of instruments for instance a volume instrument 212 and a moisture and temperature instrument 219. Further, the dynamic yield monitor system 205 includes another example of a weight instrument, the weight instrument 224. In the example shown, the weight instrument 224 is installed for instance within an impact plate in the crop chute 211. In a similar manner to the weight instrument 214, the measured weight determined by the weight instrument 224 is communicated with the receiver and processing node 218 in combination with the instrument inputs from the volume instrument 212 and the moisture and temperature instrument 219 to accordingly measure and log a plurality of harvested crop characteristics and generate variable yield values based on those measured crop characteristics. In other regards, the dynamic yield monitor system 205 operates similarly to the dynamic yield monitor system 203 shown in FIG. 2A. Stated another way, the dynamic yield monitor system 205 is able to receive instrument input from each instrument within the suite of instruments and accordingly generate dynamically varying yield values according to the crop characteristics measured in-flow within the harvester elevator 106.

As shown in FIGS. 2A and 2B, at least some of the instruments of the dynamic yield monitor systems 203, 205 are positioned within an ascending segment 204 of the harvester elevator 106. The ascending segment 204 of the harvester elevator 106 is a portion of the harvester elevator 106 consistently filled with the quantity of harvested crop 216, for instance as it travels from the trough segment 208 to the apex segment 210 where it is delivered through the crop chute 211 to the grain tank 108. Accordingly, within the ascending segment 204 the volume instrument 212 is in one example housed within the harvester elevator wall. In the example shown for instance in FIG. 2A the weight instrument 214 is installed on one or more of the paddles 202. Accordingly, and as further described herein, the weight instrument 214 is substantially static relative to the quantity of harvested crop 216 provided on the respective paddle 202.

Figure 3:
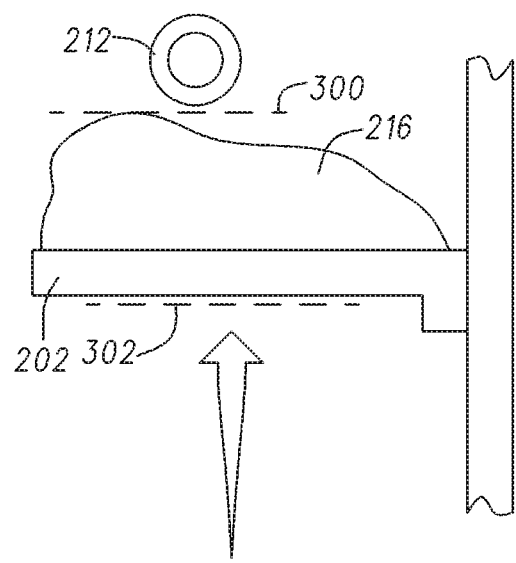
FIG. 3 is a schematic diagram one example of a volume instrument.

Referring now to FIG. 3, one example of the volume instrument 212 is provided. As shown in FIG. 3, the volume instrument 212 in one example includes an optical sensor (e.g., a a photo eye, infrared sensor or the like) positioned within a wall of the harvester elevator 106 and directed into the ascending segment 204. As shown immediately below, a paddle 202 including a quantity of harvested crop 216 thereon is elevated toward the volume instrument 212. As further shown with the dashed lines in FIG. 3 a measurement initiating locus 300 and a measurement terminating locus 302 are noted.

As the quantity of harvested crop 216 is elevated through the ascending segment 204 the paddle 202 and the crop thereon will accordingly travel by the volume instrument 212. As the upper end of the quantity of harvested crop 216 passes by the volume instrument 212 (corresponding to the measurement initiating locus 300) the volume instrument 212 begins its measurement, is accordingly able to "see" the quantity of harvested crop 216 (e.g., notes darkening within the ascending segment 204) and communicates with the receiver and processing node 218 or an integrated microcontroller to begin measuring a time period corresponding to the passage of the quantity of the harvested crop 216 and the paddle 202 past the volume instrument 212. As the measurement terminating locus 302 passes by the volume instrument 212 the instrument correspondingly notes the termination of the measurement (e.g., notes lightening within the ascending segment). Based on the measured period of time between the initiating locus 300 and the terminating locus 302 the receiver and processing node 218 is able, through statistical analysis corresponding to empirically determined characteristics of the harvester elevator 106 and the crop, the volume of the quantity of harvested crop 216.

Measurements are delivered from the volume instrument 212 to the receiver and processing node 218, for instance by one or more of a wired connection, wireless connection or the like. In one example the receiver and processing node 218 takes the input volume information (e.g., dark and light detection) and accordingly determines a volume crop characteristic for instance by way of a statistical model based on, as previously described, the characteristics of the crop being harvested as well as the empirically determined characteristics of the harvester elevator 106 (e.g., the area of the paddle 202, the dimensions of the elevator passage, the speed of the elevator paddle 202 and the like).

Figure 4:
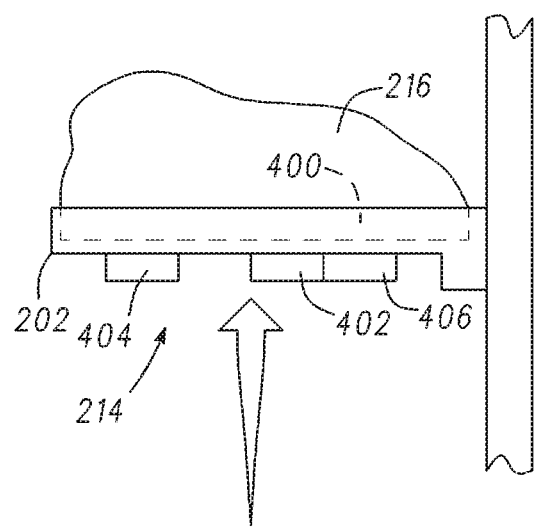
FIG. 4 is a schematic diagram of one example of a paddle mounted weight instrument.

Referring now to FIG. 4, one example of the weight instrument 214 is provided. As previously shown in FIG. 2A, the weight instrument 214 is in one example installed with one or more of the paddles 202. One example of such a paddle 202 is provided in FIG. 4. As shown the weight instrument 214 includes a weight sensor 400 positioned within or adjacent to the paddle 202. The weight sensor 400 includes, but is not limited to, one or more types of weight sensors such as load cells, strain gauges, piezo elements or the like positioned below a movable plate or incorporated into the surface of the paddle 202. As further shown in FIG. 4, the weight instrument 214 in another example includes a microcontroller 402 in communication with the weight sensor 400. The microcontroller 402 is powered in one example by a power source 404 (e.g., a battery, capacitor charged by the movement of the paddle 202 within the harvester elevator 106, or the like). As further shown in FIG. 4, the microcontroller 402 is in one example coupled with a transmitter 406 such as a radio or wireless transmitter. The transmitter 406 facilitates communication between the weight instrument 214 and the receiver and processing node 218. Accordingly, the moving weight instrument 400 is able to deliver the measured weight of a quantity of the harvested crop 216 to the receiver and processing node 218 even while ascending through the ascending segment 204.

The weight instrument 214 shown in FIG. 4 determines a static weight of the quantity of harvested crop 216 (in contrast to a dynamic weight where the crop moves relative to the sensor). For instance, as the paddle 202 is ascending through the ascending segment 204 the quantity of harvested crop 216 is static relative to the paddle 202. Accordingly, any weight determinations made with the weight instrument 214 are not subject to dynamic loading of the instrument by the quantity of harvested crop 216 (for instance as is the case with a harvested crop impacting an impact plate). Instead, the quantity of the harvested crop 216 is statically positioned on the paddle 202 and accordingly the weight sensor 400, within the ascending segment, conducts one or more weight measurements and thereby accurately measures the weight of the quantity of harvested crop 216 and delivers the measurement to the receiver and processing node 218.

Figure 5:
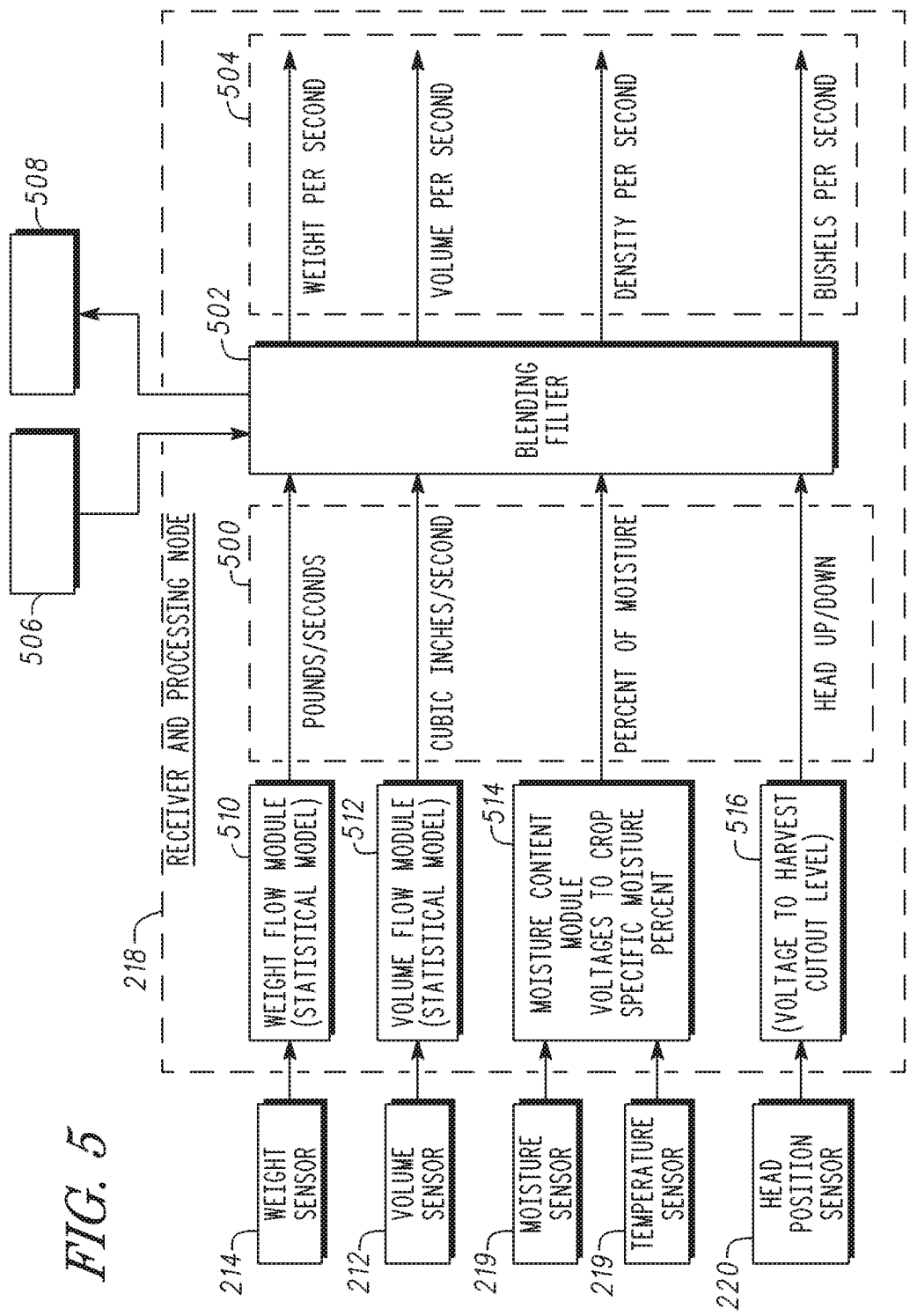
FIG. 5 is a block diagram showing one example of a yield monitor receiving and processing node.

FIG. 5 shows one example of the receiver and processing node 218 previously shown in FIGS. 2A and 2B. As shown, a plurality of inputs are provided to the receiver and processing node 218 including one or more inputs from the suite of sensors previously described herein. In FIG. 5, the instruments such as the volume instrument 212, the weight instrument 214, the moisture and temperature instrument 219 and the head position instrument 220 are shown in communication with the receiver and processing node 218. As will be described in detail herein, the plurality of inputs (measurements) from the instruments are used by the receiver and processing node 218 to accordingly determine one or more corresponding crop characteristics 500 and variable yield values based on the measured characteristics.

As further shown in FIG. 5 the crop characteristics 500 are input to a filter, such as a blending filter 502 that provides one or more numerical calculations, models and the like configured to use the input harvested crop characteristics 500 to accordingly determine a plurality of variable yield values 504. In another example, the receiver and processing node 218 further includes an indexing module 506 and a yield map module 508. As will be described herein, the indexing module 506 is in communication with a position location system for the harvester 100, such as the antenna 110 previously described herein. Accordingly, one or more of the crop characteristics 500 and the variable yield values 504 are associated with the location of the harvester 100 to accordingly provide indexed locations for each of the determined crop characteristics 500 and variable yield values 504 as they are dynamically determined in-flow crop. In another example the yield map module 508 includes these indexed crop characteristics and variable yield values 500, 504 and plots these characteristics on a yield map to accordingly generate a yield map including the crop characteristics 500 and the variable yield values 504 plotted thereon.

As previously described, the receiver and processing node 218 is in communication with the suite of instruments previously described and shown in FIGS. 2A and 2B. For instance the measurements of the weight instrument 214 are input to the receiver and processing node 218, for instance into a weight flow module 510. The weight flow module 510 includes a statistical model generated according to empirical analysis of for instance the harvester elevator 106, the paddles 202 and other characteristics, such as characteristics of the harvested crop to accordingly use the signal provided by the weight instrument 214 to generate a harvested crop characteristic corresponding to a weight characteristic (e.g., weight per second) that is then input to the blending filter 502.

In a similar manner, the volume instrument 212 is in communication with a volume flow module 512 of the receiver and processing node 218. The volume flow module 512 includes a statistical model configured to interpret the signal provided by the volume instrument 212 and accordingly determine a volume crop characteristic (e.g., cubic inches per second) corresponding to the variable volume of the harvested crop measured as it flows through the harvester elevator 106.

In another example, the receiver and processing node 218 is in communication with other instruments of the dynamic yield monitor systems 203, 205 shown in FIGS. 2A and 2B. For instance the node 218 is in communication with the moisture and temperature instrument 219 and optionally the head orientation instrument 220. In the example of the moisture and temperature instrument 219, the instrument is in communication with a moisture content module 514. The moisture content module 514 is configured to interpret data provided by the moisture and temperature instrument 219 and accordingly determine a harvested crop moisture (e.g., percent moisture content) as one of the harvested crop characteristics 500. In another example, the header orientation instrument 220 is in communication with a header module 516 of the receiver and processing node 218. The header module 516 interprets the signal from the header orientation instrument 220 and accordingly provides an input to the blending filter 502 corresponding to up position or down position of the header 104.

Accordingly, as shown in FIG. 5 each of the instruments of the suite of instruments 212, 214, 219, 220 generates one or more corresponding harvested crop characteristics 500 that are input to the blending filter 502. The input harvested crop characteristics 500 are used to generate one or more variable yield values 504. Optionally, each of the harvested crop characteristics 500 as they are determined (e.g., as the harvester 100 moves through a field and accordingly generates a plurality of each of the crop characteristics) is indexed with the indexing module 506 to the zone corresponding to the particular crop characteristic at a particular time. Accordingly, the dynamic yield monitor system 203 (or 205) is able on an ongoing basis to associate the varying harvested crop characteristics 500 as they change within the field with the corresponding location (e.g., a zone) within the field from which the in-flow and measured harvested crop was harvested.

Referring again to FIG. 5, as the harvested crop characteristics 500 are generated on an ongoing basis, for instance as the harvester 100 moves through a field, the blending filter 502 receives the harvested crop characteristics 500 as inputs. The blending filter 502 thereafter blends the harvested crop characteristics 500 by way of one or more yield equations, models and the like to generate corresponding variable yield values 504 that vary according to changes in the harvested crop characteristics 500. One example of standard yield equation (provided below) uses each measured characteristic (e.g., weight, volume, moisture and temperature) and test weight determined based on these characteristics to generate a yield value.

$$\text{Standard Bushels} = \text{Measured Bushels} \times \frac{100 - \text{Measured \% Moisture}}{100 - \text{Standard \% Moisture}} \times \frac{\text{Test Weight}}{\text{Standard Test Weight}}$$

Measured bushels and test weight are determined according to the measured characteristics (e.g., volume, weight, moisture content and temperature). As described herein, each of these characteristics are dynamically measured on an on-going continuous based, and are not based on assumptions (e.g., assumptions of test weight). By measuring and determining each of the relevant inputs for yield equations (e.g., volume, weight and optionally moisture content and temperature) accurate and varying yield values 504 are also correspondingly determined on an on-going dynamic basis.

The blending filter 502 is in one example configured to generate one or more variable yield values 504 including but not limited to weight per second, volume per second, density per second (e.g., test weight) and bushels per second of the harvested crop. In a similar manner to the harvested crop characteristics 500 each of the variable yield values 504 as they are generated are optionally indexed for instance by way of the indexing module 506 with a corresponding location of the harvester 100 within the field. Accordingly, the variable yield values 504, like the harvested crop characteristics 500, are readily associated with the particular area or zone of the field that provided the harvested crop related to the harvested crop characteristics 500 and the related variable yield values 504.

The variable yield values 504 (in the same manner as the harvested crop characteristics 500) are accordingly dynamically determined on an on-going basis as the harvester 100 moves through a field. Each of the harvested crop characteristics 500 in one example are fed through the blending filter 502 to accordingly determine the variable yield values 504. As the harvested crop characteristics 500 change (e.g., as the harvested crop from varying zones of the field) the corresponding variable yield values 504 also change. The dynamic yield monitor system 203 (or 205) as shown in FIG. 2A (or 2B) is accordingly able to determine the harvested crop characteristics 500 and the variable yield values 504 on an instantaneous and on-going basis and thereby accurately note variation in each of the harvested crop characteristics 500 and the related variable yield values 504 dependent upon the location of the harvester 100 within the field.

As previously described and further shown in FIG. 5, the yield map module 508 is further in communication with the blending filter 502. In a similar manner to the association of the harvested crop characteristics 500 with the particular locations with the indexing module 506, the yield map module 508 communicates with the indexing module 106 for instance by way of the blending filter 502 to associate and generate a yield map including for instance a plurality of zones and the corresponding harvested crop characteristics 500 and variable yield values 504 measured and determined for the particular zones. Accordingly, the yield map module 508 generates a yield map for a particular field including a plurality of zones therein with one or more of the associated harvested crop characteristics 500 and the variable yield values 504 for each of the zones mapped to the various zones on the generated yield map.

Referring again to FIG. 5, as shown the plurality of instruments such as the volume instrument 212 and the weight instrument 214 as well as the moisture and temperature instrument 219 provide inputs to the receiver and processing node 218. Accordingly, the blending filter 502 with the corresponding harvested crop characteristics 500 is able to determine a test weight on an ongoing basis without any assumptions being made regarding the test weight of a crop for a field. Accordingly, the dynamic yield monitor system 203 (or 205) is not constrained by assumed values for one of the variables of a yield equation. An operator is not required to enter an assumed test weight when preparing to harvest within a particular field. Instead, with the ongoing measurements of both weight and volume, for instance with the weight instrument 214 and the volume instrument 212, a corresponding test weight (one of the variable yield values 504 shown in FIG. 5) is accordingly determined accurately and instantaneously according to the corresponding dynamically determined harvested crop characteristics 500 (e.g., the harvested crop weight and the harvested crop volume.

In another example, the addition of the moisture and temperature instrument 219 provides further information to more accurately determine the test weight variable yield value 504 for use in the determination of other variable yield values (e.g., bushels, weight and volume based yield values and the like). For instance, the harvested crop characteristics 500 including the harvested crop weight, harvested crop volume and the harvested crop moisture content and temperature are fed on an on-going basis to the blending filter 502 and accordingly generate corresponding test weight values that accurately represent the test weight of the harvested crop, for instance the inflow harvested crop as it moves through the harvester elevator 106, without requiring any static assumption of a test weight made for instance prior to harvesting of the harvester 100 within a field. Stated another way, the test weight yield value (one of the variable yield values 504 shown in FIG. 5) is generated in an accurate and ongoing dynamic fashion that facilitates more accurate yield values (e.g., bushels per second) when input into a yield equation.

Accordingly, the previous need to assume a test weight is removed and a more accurate determination of yield values provided according to the measurements of harvested crop characteristics of an in-flow crop within the harvester elevator 106.

Figure 6:
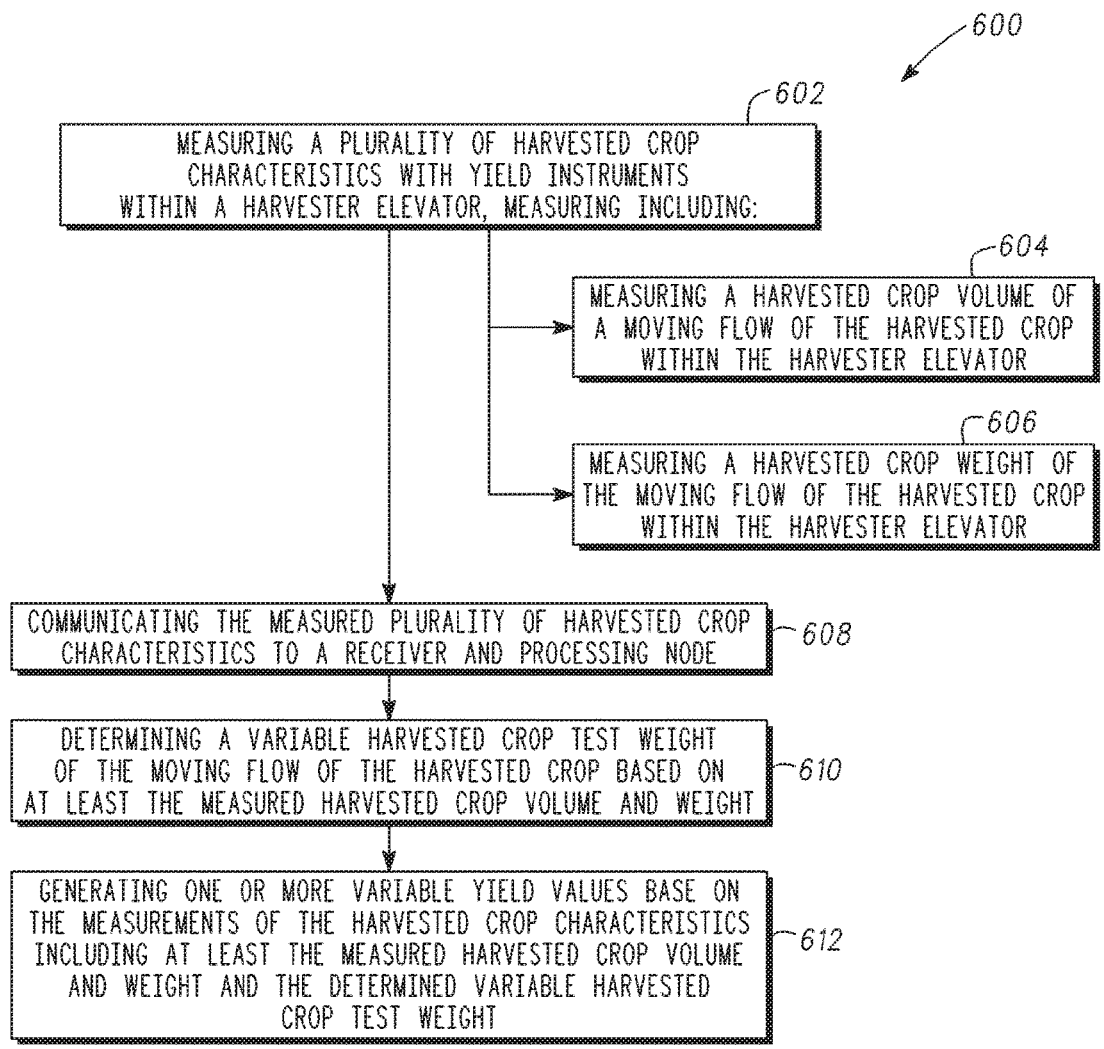
FIG. 6 is a block diagram showing one example of a method for measuring one or more dynamic yield values for a harvested crop.

FIG. 6 shows one example of a method 600 for dynamically measuring yield, for instance with the dynamic yield monitor systems 203, 205 previously described herein. In describing the method 600, reference is made to one or more components, features, functions and steps described herein. Where convenient, reference is made to the components, features, steps and the like with reference numerals. Reference numerals provided are exemplary and are not exclusive. For instance features, components, functions, steps and the like described in the method 600 include, but are not limited to, the corresponding numbered elements provided herein. Other corresponding features described herein (both numbered and unnumbered) as well as their equivalents are also considered.

At 602, the method 600 includes measuring a plurality of harvested crop characteristics 500 with a suite of yield instruments within a harvester elevator 106. In one example, the suite of instruments (e.g., one or more instruments) includes a volume instrument 212 and a weight instrument 214. Optionally, a moisture and temperature instrument 219 and a header orientation instrument 220 are also provided. At 604, measuring the plurality of harvested crop characteristics includes measuring a harvested crop volume with the volume instrument 212 of a moving flow of the harvested crop (e.g., a quantity of the harvested crop 216) within the harvester elevator 106. At 606, measuring of the harvested crop characteristics further includes measuring a harvested crop weight of the moving flow of the harvested crop within the harvester elevator 106.

At 608, the measured plurality of harvested crop characteristics 500 are communicated (e.g., wirelessly) to a receiver and processing node 218. At 610, the receiver and processing node 218 determines a variable harvested crop test weight of the moving flow of the harvested crop based on at least the measured harvested crop volume and weight. That is to say, with the harvested crop characteristics 500, for instance the dynamically changing harvested crop volume and weight (variable as the harvester 100 continues to harvest within a field), the receiver and processing node 218 is configured to use each of these harvested crop characteristics to accurately and dynamically determine a variable yield value 504, such as the harvested crop test weight. As described herein, the dynamic yield monitor systems 203, 205 are accordingly configured to determine one or more variables (e.g., the harvested crop characteristics) of yield equations. Optionally, the dynamic yield monitor systems 203, 205 are configured to determine all of the variables of yield equations (e.g., weight, volume, moisture content and temperature, the test weight related to these variables). Stated another way, the dynamic yield monitor systems 203, 205 are configured to accurately monitor each of the harvested crop characteristics without reliance on assumed values for one or more of the variables. Further, the dynamic yield monitor systems 203, 205 are configured to measure each of the harvested crop characteristics dynamically (e.g. as they vary during harvesting) to accordingly accurately represent the characteristic measurements throughout a harvesting operation.

At 612 the method 600 further includes generating one or more variable yield values, such as the variable yield values 504 shown in FIG. 5. The variable yield values 504 are based on the measurements of the harvested crop characteristics including at least the measured harvested crop volume and weight and the determined variable harvested crop test weight. That is to say, with the variable test weight previously determined at 610 the receiver and processing node 218 is able to generate accurately and on an ongoing basis one or more variable yield values including, but not limited to, the harvested crop weight per unit time, volume per unit time and bushels per unit time determined according to one or more accepted yield equations. Stated another way, with the method 600 each of the plurality of harvested crop characteristics 500 and the corresponding yield values 504 are determined in an ongoing dynamic basis according to measurements of at least the harvested crop volume and harvested crop weight of the in-flow harvested crop as previously described herein. Further, the harvested crop test weight is determined based on both of the harvested crop volume and the harvested crop weight without requiring assumption of a test weight. Accordingly, the variable yield values 504 based, at least in part, on the variable test weight are more accurately determined as the test weight itself is based upon actual measured data corresponding to the harvested crop characteristics of volume and weight determined in an ongoing basis as the harvester 100 operates within a field.

Several options for the method follow. In one example measuring the plurality of harvested crop characteristics 500 includes measuring a harvested crop moisture content and temperature of the moving flow of the harvested crop (e.g., in-flow) within the harvester elevator 106, for instance with a moisture and temperature instrument 219 as shown in FIGS. 2A and 2B. In another example, measuring the harvested crop weight includes measuring the weight of a quantity of the harvested crop 216 while moving the quantity along an ascending segment 204 of the harvester elevator 106. The quantity of the harvested crop 216 is carried by one or more paddles 202 and the quantity of the harvested crop 216 is static relative to the weight instrument 214 as the weight instrument 214 and the quantity of harvested crop 216 carried thereon ascend together within the ascending segment 204.

In another example, determining the variable harvested crop test weight includes determining the variable harvested crop test weight based on the measured harvested crop volume, weight, the harvested crop temperature and harvested crop moisture content as each of the plurality of harvested crop characteristics change within a field. As previously stated, as the harvester 100 moves through a field the dynamic yield monitor systems 203, 205 (FIGS. 2A and 2B) are configured to determine each of the harvested crop characteristics 500 in an ongoing and dynamic manner to accordingly determine variable values for each. The yield values, for instance including the determined test weight, are correspondingly determined in an ongoing and dynamic fashion for instance without assumptions regarding the test weight. Instead, the test weight is determined based on the measured harvested crop weight and harvested crop volume (as well as the optional measured moisture and temperature). For instance in one example measuring the harvested crop volume includes measuring a first harvested crop volume corresponding to a first field location (such as a first zone) and measuring a second harvested crop volume corresponding to a second field location (corresponding to a second zone). In a similar manner, measuring the harvested crop weight includes measuring a first harvested crop weight corresponding to a first field location and a second harvested crop weight corresponding to a second field location (e.g., first and second zones). Based on these harvested crop characteristics 500 associated with respective first and second field locations a harvested crop test weight at a first location is determined based on the first harvested crop volume and crop weight and a second harvested crop test weight is determined based on the second harvested crop volume and crop weight. Accordingly, the harvested crop test weight changes according to the corresponding harvested crop characteristics 500 determined for the field location corresponding to both of at least the harvested crop weight and volume.

In another example, generating the one or more variable yield values includes communicating the measured plurality of harvested crop characteristics to the receiver and processing node 218 and generating the one or more variable yield values includes generating one or more variable yield values including, but not limited to, a variable volume value, a variable weight value or a variable test weight value (e.g., density). The variable volume value, variable weight value and the variable test weight value correspond, for instance, to a volume per unit of time, a weight per unit of time and a variable test weight per unit of time (density per unit time) or their instantaneous equivalents at a particular time or times.

In still another example, the method 600 further includes associating one or more of the variable yield values with a plurality of corresponding locations of an agricultural field for instance by way of the indexing module 506 previously shown in FIG. 5. In another example, the method 600 further includes generating a yield map, for instance based on the associated one or more variable yield values and the corresponding harvested crop characteristics 500 according to their respective positions. For instance, each of the indexed variable yield values 504 and harvested crop characteristics 500 are assigned to their corresponding zones on the yield map by way of a yield map module 508 such as that shown in FIG. 5.

Figure 7:
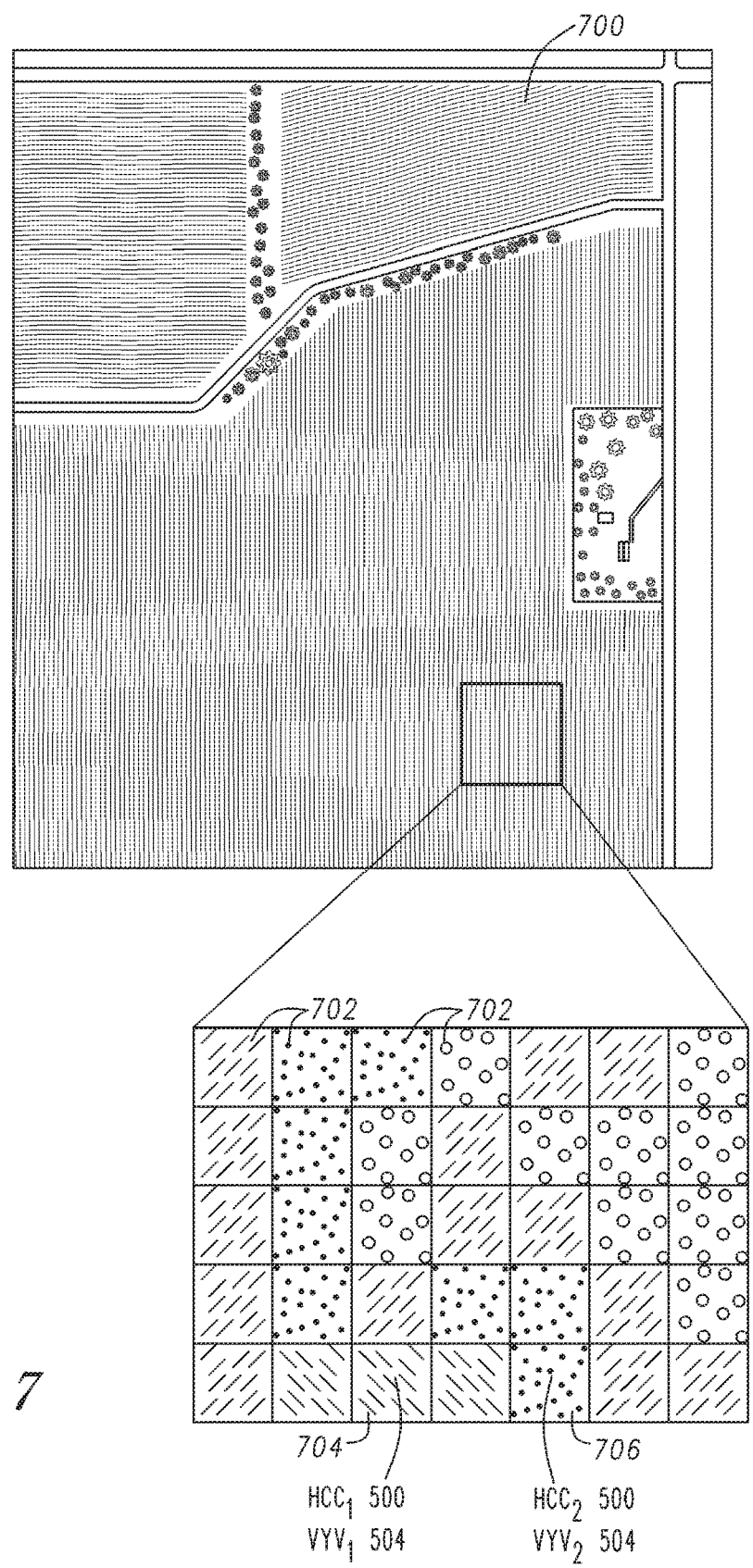
FIG. 7 is a top view of one example of an agricultural field during harvesting of a crop by a harvester including the dynamic yield monitor system of FIG. 2.

FIG. 7 is a demonstrative example of a yield map 700. Optionally, the yield map 700 includes but is not limited to a visual representation of one or more of the harvested crop characteristics 500 previously shown in FIG. 5 and optionally one or more variable yield values 504 also shown in FIG. 5. A zoomed in portion of the yield map 700 is shown in the right view of FIG. 7. As shown by way of varying stippling, cross hatching, shading or the like a plurality of zones 702 have corresponding harvested crop characteristics 500 and variable yield values 504. For instance, as shown in FIG. 7 a plurality of zones 702 having varying crop characteristics and yield values according to actual measured data for instance provided by the suite of yield instruments such as the instruments 212, 214, 219, 220 previously shown in FIG. 5 and further shown in FIGS. 2A and 2B are associated with the one or more zones 702. Accordingly, each of the zones 702 includes in one example an array of information including one or more harvested crop characteristics or one or more corresponding variable yield values 504.

As further shown, for instance in FIG. 5, the variable yield values 504 include one or more yield values corresponding to a weight per unit time, a volume per unit time and a density per unit time (e.g., a test weight per unit time). The yield map 700 accordingly provides a representation to the operator of the harvested output (e.g., yield) provided during a harvesting operation. Information provided by the yield map 700 is optionally used to determine better husbandry techniques, planting strategies and the like for the field in the next season. Accordingly, by measuring each of the harvested crop characteristics 500 on an on-going dynamic basis and accordingly dynamically determining one or more variable yield values 504 more accurate and helpful yield maps are generated based on actual measured data (without intervening static assumptions, e.g., test weight assumptions).

Referring again to FIG. 7, first and second representative zones 704, 706 are provided. As shown each of the zones 704, 706 has different stippling, cross hatching, shading or the like associated with one or more of the variable yield values 504 or harvested crop characteristics 500. Optionally the first and second zones 704, 706 (or any of the plurality of zones 702) have varying stippling, shading, cross hatching or coloring techniques, textual indications or values, or any combination thereof to accordingly provide indications (qualitatively or quantitatively) of one or more values (e.g., the harvested crop characteristics 500 or variable yield values 504). In the example shown in FIG. 7, the first zone 704 has an associated harvested crop characteristic ($HCC_1$ 500) and a variable yield value ($VYV_1$ 504). In one example the respective harvested crop characteristic 500 and the variable and yield value 504 correspond to one or more of the corresponding harvested crop characteristics described herein as well as one or more of the variable yield values described herein. In a similar manner, the second zone 706 accordingly includes one or more harvested crop characteristics ($HCC_2$) 500 and one or more variable yield values ($VYV_2$) 504.

Accordingly, as shown in FIG. 7 by way of the stippling, shading, coloring, textual indications or values or the like the harvested crop characteristics 500 and variable yield values 504 are indexed for each of the zones 702 (e.g., associated with each of the corresponding zones). As shown for instance in the first and second zones 704, 706 the stippling is different between the zones thereby indicating one or more of the characteristics therebetween vary. Optionally, the yield map 700 provides one or more interactive zones 702. For instance the user is able to zoom in and examine each of the zones 702 to accordingly allow (e.g., through a graphical user interface) interaction with the field map 700 to accordingly determine one or more of the characteristics of one or a plurality of the zones 702 of interest.

Referring now to FIG. 8, one example of a tabular representation of the plurality of harvested crop characteristics and variable yield values (dynamically varying according to the measured characteristics provided by the dynamic yield monitor systems 203, 205) is provided. As shown for instance in the left column of the table a plurality of zones such as zones $Z_1$-$Z_{N+10}$ is provided. As shown in the array of values one or more of the harvested crop characteristics 500 including for instance volume, weight, moisture content and temperature is provided and associated with each of the zones. Further, one or more variable yield values 504 such as test weight, bushels per second and total bushels is optionally provided in other columns of the table. In the exemplary table shown in FIG. 8 each of the harvested crop characteristics 500 used for instance in one or more standard yield calculations is provided, including for instance the volume, weight, moisture content and temperature measurements that are measured in the respective zones. Additionally, as described herein the volume and weight (and optionally the moisture content and temperature) are used to determine the test weight. In an example, the test weight (e.g., density) for instance includes the measured volume (e.g., a harvested crop characteristic 500) from the volume flow module 512 divided by the measured weight (e.g., harvested crop characteristic 500) from the weight flow module 510. In another example, the test weight includes the measured volume divided by the measured weight (both measured on an on-going basis as described herein) and further adjusted according to the measured moisture content and temperature (e.g., also crop characteristics 500 measuring on an on-going basis) to more accurately determine the test weight yield value (used in other yield determinations).

As further previously stated herein, the test weight is dynamically determined according to volume and weight measurements and accordingly is not provided according to one or more assumptions. The test weight instead varies with differing measurements of the volume and weight of the harvested crop for instance as the harvester 100 operates within the field for instance the field shown in the yield map 700. As shown in FIG. 8, the characteristics and yield values provided therein are accordingly associated with each of the zones. In one example the measured data as well as the determined data such as the variable yield values associated with each of the zones are accordingly then plotted within the yield map 700.

With either of the yield map 700 of FIG. 7 or the table presented in FIG. 8 the operator of the harvester 100 or other technician is able to receive a graphical or tabular representation of one or more of the harvested crop characteristics 500 and optionally one or more of the variable yield values 504 as they are dynamically measured, for instance with the dynamic yield monitor systems 203, 205 shown in FIGS. 2A and 2B. Further, with the dynamic yield monitor systems 203, 205 as described herein each of the harvested crop characteristics used with standard yield equations is accordingly determined. Corresponding yield values such as weight per unit time, volume per unit time and total output for instance bushels per unit time or total bushels for a particular zone are thereby accordingly accurately determined without assumptions made for instance regarding test weight.

In one example, the modules such as the indexing module 506 and the yield map module 508 in communication with the blending filter 502 shown in FIG. 5 are configured to generate the graphical representation shown with the yield map 700 of FIG. 7 as well as the tabular representation in FIG. 8. That is to say, with the indexing module 506 a particular zone is associated with one or more of the harvested crop characteristics and the variable yield values corresponding to the zone in the tabular representation shown in FIG. 8. The yield map module 508 accordingly interprets the data provided by the indexing module 506 in combination with the blending filter 502 and provides the graphical representation shown with the yield map 700.

Figure 9:
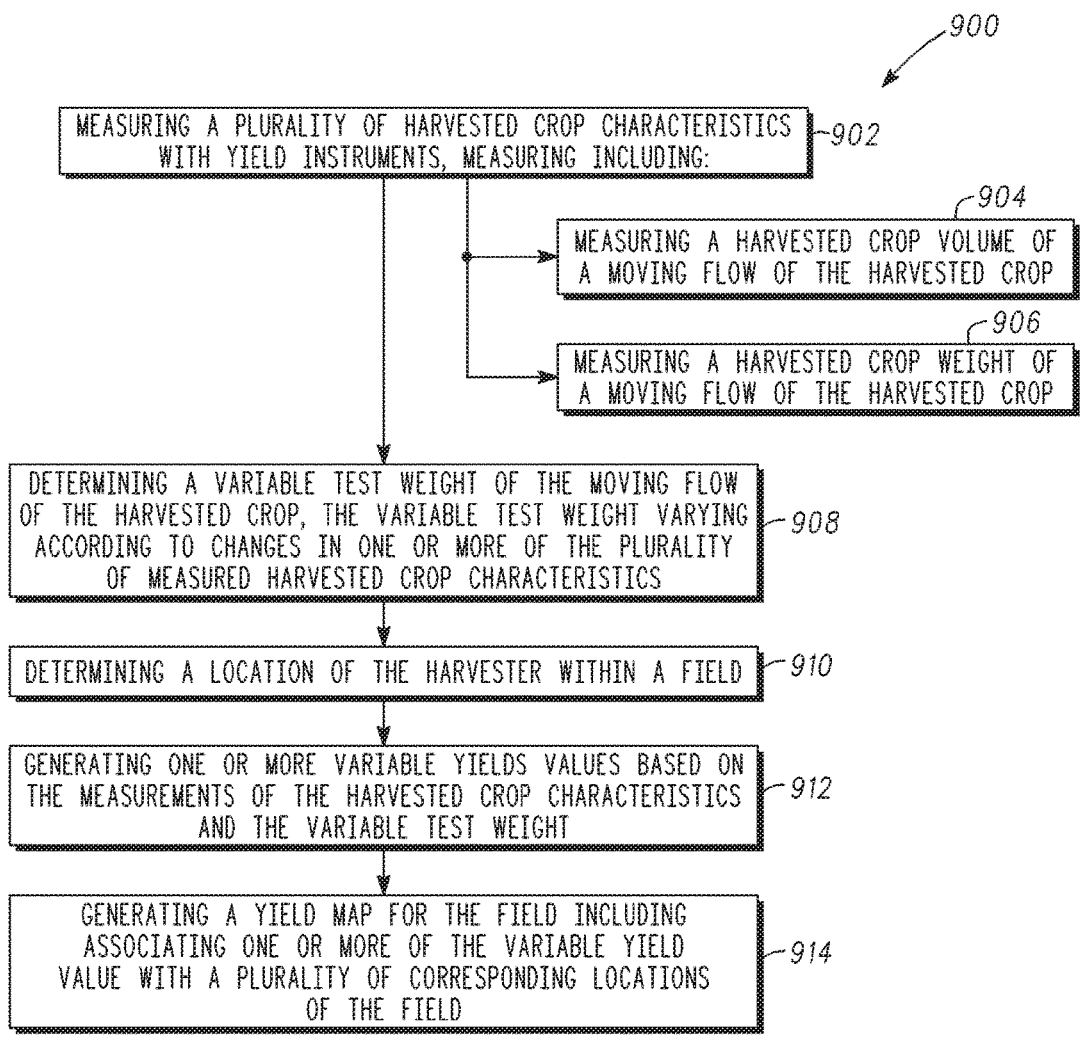
FIG. 9 is a block diagram showing one example of a method for generating a location based yield map.

FIG. 9 shows one example of a method 900 for generating a variable crop measurement based yield map such as the yield map 700 shown in FIG. 7. In describing the method 900 reference is made to one or more components, features, functions and steps described herein. Where convenient reference is made to the components, features, steps and the like with reference numerals. Reference numerals provided are exemplary and are not exclusive. For instance features, components, functions, steps and the like described in the method 900 include but are not limited to the corresponding numbered elements provided herein. Other corresponding features described herein (both numbered and unnumbered) as well as their equivalents are also considered.

At 902, the method 900 includes measuring a plurality of harvested crop characteristics (e.g., the characteristics 500 shown for instance in FIG. 5) with a suite of yield instruments. In one example, measuring includes measuring a harvested crop volume at 904 of a moving flow of the harvested crop (e.g., a quantity 216 or a plurality of quantities of the harvested crop). In another example, measurement of the plurality of harvested crop characteristics includes measuring a harvested crop weight of a moving flow of the harvested crop at 906. In one example the volume of the moving flow of the harvested crop is measured with a volume instrument 212 (e.g., a photo eye or IR sensor) provided within an ascending segment 204 of the dynamic yield monitor system 203 (or 205). In another example, measuring the harvested crop weight is conducted with a weight instrument 214, for instance a weight instrument associated with one or more of the paddles 202. In another example, a weight sensor 224 provided within the crop chute 211 is used to measure the weight of the moving flow of the harvested crop through measurement of the impact on an impact plate in the chute.

At 908 a variable test weight of the moving flow of the harvested crop is determined. As previously described herein, the variable test weight varies according to changes in one or more of the plurality of measured harvested crop characteristics including for instance the measurements of the harvested crop volume and the measurements of the harvested crop weight. Accordingly, assumptions regarding the test weight are thereby avoided. Instead, the harvested crop volume and the harvested crop weight (and optionally the harvested crop moisture content and temperature) are used to dynamically determine the test weight throughout a harvesting operation (e.g., in an on-going fashion that varies based on dynamic measurements of at least the crop volume and weight).

At 910, the method 900 further includes determining a location of the harvester 100 within a field for instance the field shown in the representative yield map 700 of FIG. 7. In one example, determining the location of the harvester within the field includes the use of an antenna 110, for instance in communication with a localized position sensing system local to the field shown in FIG. 7 or a global positioning system (GPS). In one example, the location of the harvester 100 within the field is associated with one or more corresponding zones in the field for instance the zones 702 shown in the views of FIG. 7.

At 912, the method 900 further includes generating one or more variable yield values 504 based on the measurements of the harvested crop characteristics 500 and the variable test weight previously determined herein. As shown for instance in FIG. 5, in one example the receiver and processing node 218 includes a blending filter 502 configured to receive each of the harvested crop characteristics 500 as inputs and accordingly determine one or more of the variable yield values 504 in a dynamic on-going manner according to changing values of the harvested crop characteristics 500. For instance, as previously described herein variable yield values are determined in one example with one or more standardized equations for determining yield. By providing each of the harvested crop characteristics necessary for the yield equations including for instance weight, volume, moisture and temperature as well as the test weight (based on at least the measured weight and measured volume) as they dynamically change in the field the corresponding yield values vary dynamically and accurately represent the actual yield throughout the field (and locally at one or more zones 702).

At 914, a yield map is generated for the field such as the field shown in FIG. 7 that includes associating one or more of the variable yield values determined at 912 with a corresponding plurality of locations of the field. Stated another way, the variable yield values (and optionally one or more of the harvested crop characteristics 500) are associated with the zones 702 of the field. For instance, the harvested crop characteristics 500 and the variable yield values 504 are associated with locations determined by way of an indexing module 506 associated with the blending filter 502. The indexing module 506 in one example uses information provided by the position sensing system (e.g., the antenna 110) regarding the location of the harvester 100 and accordingly associates the determined location of the harvester 100 with the one or more harvested crop characteristics 500 and the corresponding variable yield values 504. Accordingly a yield map, such as the yield map 700 shown in FIG. 7, is generated with the corresponding variable yield values and harvested crop characteristics associated with each of the respective zones 702.

Several options for the method 900 follow. In one example determining the variable test weight includes determining the variable test weight based on at least the measured harvested crop volume and weight as the plurality of harvested crop characteristics vary in a field, for instance as the harvester 100 moves through the field during a harvesting operation and accordingly harvests crops in differing locations (e.g., differing zones 702). In one example, measuring the harvested crop volume includes measuring a first harvested crop volume corresponding to a first field location (such as the first zone 704 shown in FIG. 7) and measuring a second harvested crop volume corresponding to a second field location (such as the second zone 706). Additionally, the method 900 includes measuring the harvested crop weight such as measuring a first harvested crop weight corresponding to a first field location (the first zone 704) and measuring a second harvested crop weight corresponding to a second field location (the second zone 706). In another example determining the variable test weight includes determining a first variable test weight based on the first harvested crop volume and crop weight, for instance associated with the first zone 704, and determining a second variable test weight based on the second harvested crop volume and crop weight associated with the second zone 706.

Optionally, generating the one or more variable yield values 504 includes generating one or more of a variable volume value, a variable weight value or a variable test weight value (density), for instance including a measured crop weight or determined dry harvested crop weight as described herein. In one example these values include, but are not limited to, weight per unit time, volume per unit time and density per unit time as well as their instantaneous equivalents. In still another example the method 900 includes sensing a header orientation for instance with the header orientation instrument 220 shown in FIGS. 2A and 2B. In one example the indexing module 506 associates the sensed up header orientation or a sensed down header orientation with one or more of the corresponding locations of the field and the one or more harvested crop characteristics 500 or the variable yield values 504. In one example, with a "down" sensed header orientation the indexing module 506 interrupts association of one or more of the harvested crop characteristics 500 or the variable yield values 504 with the corresponding location of the harvester 500 on the field for instance the field shown in the yield map 700. In another example, with a sensed "up" header orientation the indexing module 506 permits association of the location of the harvester 100 with the variable yield values 504 (and optionally the harvested crop characteristics 500 as described herein).

In still another example the method 900 includes measuring the harvested crop weight while moving the quantity for instance a quantity of the harvested crop 216 along an ascending segment 204 of a harvester elevator 106. The quantity of the harvested crop 216 is carried by one or more paddles 202 and the quantity is static relative to a weight instrument such as the weight instrument 214 associated with the paddle 202. In another example, determining the variable test weight as described herein includes determining the variable test weight based on the measured harvested crop volume, weight and a harvested crop temperature and a harvested crop moisture content, for instance determined with the moisture and temperature instrument 219 shown in FIGS. 2A and 2B.

Various Notes & Examples

Example 1 can include subject matter such as dynamic yield monitor system comprising: a suite of yield instruments for measuring a plurality of harvested crop characteristics while a harvested crop is in-flow within a harvester elevator, including: a volume instrument configured for coupling with the harvester elevator, the volume instrument measures a harvested crop volume from the in-flow harvested crop within the harvester elevator, and a weight instrument configured for coupling with the harvester elevator, the weight instrument measures a harvested crop weight from the in-flow harvested crop within the harvester elevator; and a receiver and processing node in communication with the suite of yield instruments, the receiver and processing node configured to determine: a variable harvested crop test weight based on at least the measured harvested crop volume and measured harvested crop weight of the in-flow harvested crop, and a variable yield of the harvested crop based on the measured harvested crop volume, the measured harvested crop weight, and the variable harvested crop test weight.

Example 2 can include, or can optionally be combined with the subject matter of Example 1, to optionally include wherein the volume instrument includes an optical volume instrument configured for coupling along an ascending segment of the harvester elevator.

Example 3 can include, or can optionally be combined with the subject matter of one or any combination of Examples 1 or 2 to optionally include wherein the weight instrument includes a paddle mounted weight instrument configured for coupling with one or more paddles of the harvester elevator.

Example 4 can include, or can optionally be combined with the subject matter of one or any combination of Examples 1 through 3 to optionally include wherein the paddle mounted weight instrument is configured to measure the harvested crop weight along an ascending segment of the harvester elevator, and a quantity of the harvest crop weighed on a paddle is static relative to the weight instrument and moving relative to the remainder of an elevator loop of the harvester elevator.

Example 5 can include, or can optionally be combined with the subject matter of one or any combination of Examples 1-4 to optionally include wherein the weight instrument includes a force impact plate configured for positioning within a crop chute of the harvester elevator.

Example 6 can include, or can optionally be combined with the subject matter of Examples 1-5 to optionally include a moisture and temperature instrument, the moisture and temperature instrument measures a harvested crop moisture and temperature from the in-flow harvested crop within the harvester elevator, and the plurality of harvested crop characteristics include the harvested crop moisture and temperature.

Example 7 can include, or can optionally be combined with the subject matter of Examples 1-6 to optionally include wherein the receiver and processing node includes a blending filter configured to determine the variable harvested crop test weight based on the measured harvested crop volume, weight, temperature and moisture as each of the plurality of harvested crop characteristics vary within a field.

Example 8 can include, or can optionally be combined with the subject matter of Examples 1-7 to optionally include wherein the receiver and processing note includes a blending filter configured to: receive the measurements of the harvested crop characteristics including the measured harvest crop volume, weight, and a harvested crop temperature and a harvested crop moisture content, and generate one or more variable yield values based on the measurements of the harvested crop characteristics, the one or more variable yield values including one or more of a variable volume value, a variable weight value or a variable test weight value.

Example 9 can include, or can optionally be combined with the subject matter of Examples 1-8 to optionally include wherein the receiver and processing node includes an indexing module in communication with a location sensor, and the receiver and processing node is configured to associate one or more of the variable yield values with a plurality of corresponding locations of an agricultural field.

Example 10 can include, or can optionally be combined with the subject matter of Examples 1-9 to optionally include wherein the receiver and processing node includes a yield map module in communication with the indexing module, and the yield map module is configured to generate a yield map including one or more of the variable yield values associated with the plurality of corresponding locations of the agricultural field.

Example 11 can include, or can optionally be combined with the subject matter of Examples 1-10 to optionally include a method for dynamically measuring yield comprising: measuring a plurality of harvested crop characteristics with a suite of yield instruments within a harvester elevator, measuring including: measuring a harvested crop volume of a moving flow of the harvested crop within the harvester elevator, and measuring a harvested crop weight of the moving flow of the harvested crop within the harvester elevator; and communicating the measured plurality of harvested crop characteristics to a receiver and processing node; determining a variable harvested crop test weight of the moving flow of the harvested crop based on at least the measured harvested crop volume and weight; and generating one or more variable yield values based on the measurements of the harvested crop characteristics including at least the measured harvested crop volume and weight and the determined variable harvested crop test weight.

Example 12 can include, or can optionally be combined with the subject matter of Examples 1-11 to optionally include wherein measuring the harvested crop weight includes: measuring the weight of a quantity of the harvested crop while moving the quantity along an ascending segment of the harvester elevator, the quantity of the harvested crop carried by one or more paddles, and the quantity of the harvested crop is static relative to a weight instrument configured to measure the weight of the quantity.

Example 13 can include, or can optionally be combined with the subject matter of Examples 1-12 to optionally include wherein communicating the measured plurality of harvested crop characteristics includes wirelessly transmitting and receiving one or more of the measured plurality of harvested crop characteristics.

Example 14 can include, or can optionally be combined with the subject matter of Examples 1-13 to optionally include wherein determining the variable harvested crop test weight includes determining the variable harvested crop test weight based on the measured harvested crop volume, weight, a harvested crop temperature and a harvested crop moisture as each of the plurality of harvested crop characteristics change within a field.

Example 15 can include, or can optionally be combined with the subject matter of Examples 1-14 to optionally include wherein: measuring the harvested crop volume includes measuring a first harvested crop volume corresponding to a first field location and measuring a second harvested crop volume corresponding to a second field location, measuring the harvested crop weight includes measuring a first harvested crop weight corresponding to a first field location and measuring a second harvested crop weight corresponding to a second field location, and determining the variable harvested crop test weight includes determining a first harvested crop test weight based on the first harvested crop volume and crop weight and determining a second harvested crop test weight based on the second harvested crop volume and crop weight.

Example 16 can include, or can optionally be combined with the subject matter of Examples 1-15 to optionally include wherein generating the one or more variable yield values includes: communicating the measured plurality of harvested crop characteristics to the receiver and processing node, and generating the one or more variable yield values includes generating the one or more variable yield values including a variable volume value, a variable weight value or a variable test weight value.

Example 17 can include, or can optionally be combined with the subject matter of Examples 1-16 to optionally include associating one or more of the variable yield values with a plurality of corresponding locations of an agricultural field.

Example 18 can include, or can optionally be combined with the subject matter of Examples 1-17 to optionally include generating a yield map including one or more of the variable yield values associated with the plurality of corresponding locations of the agricultural field.

Example 19 can include, or can optionally be combined with the subject matter of Examples 1-18 to optionally include wherein measuring the plurality of harvested crop characteristics includes measuring a harvested crop moisture content and temperature of the moving flow of the harvested crop within the harvester elevator.

Example 20 can include, or can optionally be combined with the subject matter of Examples 1-19 to optionally include a method of generating a variable crop measurement based yield map comprising: measuring a plurality of harvested crop characteristics with a suite of yield instruments, measuring including: measuring a harvested crop volume of a moving flow of the harvested crop, and measuring a harvested crop weight of a moving flow of the harvested crop; and determining a variable test weight of the moving flow of the harvested crop based on the plurality of measured harvested crop characteristics, the variable test weight varying according to changes in one or more of the plurality of measured harvested crop characteristics; determining a location of the harvester within a field; generating one or more variable yield values based on the measurements of the harvested crop characteristics and the variable test weight determined from the measured harvested crop characteristics; and generating a yield map for the field, generating the yield map including associating one or more of the variable yield values with a plurality of corresponding locations of the field.

Example 21 can include, or can optionally be combined with the subject matter of Examples 1-20 to optionally include wherein measuring the plurality of harvested crop characteristics includes measuring a harvested crop moisture content and temperature of the moving flow of the harvested crop.

Example 22 can include, or can optionally be combined with the subject matter of Examples 1-21 to optionally include wherein determining the variable test weight includes determining the variable test weight based on at least the measured harvested crop volume and weight as the plurality of harvested crop characteristics vary in a field.

Example 23 can include, or can optionally be combined with the subject matter of Examples 1-22 to optionally include wherein: measuring the harvested crop volume includes measuring a first harvested crop volume corresponding to a first field location and measuring a second harvested crop volume corresponding to a second field location, measuring the harvested crop weight includes measuring a first harvested crop weight corresponding to a first field location and measuring a second harvested crop weight corresponding to a second field location, and determining the variable test weight includes determining a first variable test weight based on the first harvested crop volume and crop weight and determining a second variable test weight based on the second harvested crop volume and crop weight.

Example 24 can include, or can optionally be combined with the subject matter of Examples 1-23 to optionally include wherein generating the one or more variable yield values includes generating one or more of a variable volume value, a variable weight value or a variable test weight value.

Example 25 can include, or can optionally be combined with the subject matter of Examples 1-24 to optionally include sensing a header orientation of a harvester, and associating one or more of a sensed up header orientation or a sensed down header orientation with one or more of the corresponding locations of the field or the one or more variable yield values.

Example 26 can include, or can optionally be combined with the subject matter of Examples 1-25 to optionally include wherein measuring the harvested crop weight includes: measuring the weight of a quantity of the harvested crop while moving the quantity along an ascending segment of a harvester elevator, the quantity of the harvested crop carried by one or more paddles, and the quantity of the harvested crop is static relative to a weight instrument associated with the paddle and configured to measure the weight of the quantity.

Example 27 can include, or can optionally be combined with the subject matter of Examples 1-26 to optionally include wherein determining the variable test weight includes determining the variable test weight based on the measured harvested crop volume, weight, and a harvested crop temperature and a harvested crop moisture.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A dynamic yield monitoring system comprising:
   a volume instrument configured for coupling with a harvester elevator, the volume instrument is configured to measure a harvested crop volume of a harvested crop ascending within the harvester elevator;
   a weight instrument configured for coupling with the harvester elevator, the weight instrument is separate from the volume instrument, and the weight instrument is configured to measure a harvest crop weight of the harvested crop ascending within the harvester elevator;
   a moisture instrument configured to measure a harvested crop moisture of the harvested crop within the harvester elevator;
   a temperature instrument configured to measure a harvested crop temperature of the harvested crop within the harvester elevator; and
   a receiver and processing node in communication with each of the volume, weight, moisture and temperature instruments, the receiver and processing node configured to determine:
   a variable harvested crop test weight based on at least the measured harvested crop volume and measured harvested crop weight of the harvested crop ascending within the harvester elevator and the measured harvested crop temperature and measured harvested crop moisture, and
   a variable yield of the harvested crop based on the measured harvested crop volume, the measured harvested crop weight, the measured harvested crop temperature, measured harvested crop moisture and the variable harvested crop test weight.

2. The dynamic yield monitoring system of claim 1, wherein one of the volume or weight instruments is configured to move relative to the of the weight or volume instruments.

3. The dynamic yield monitoring system of claim 1, wherein the weight instrument is configured to move relative to the volume instrument.

4. The dynamic yield monitoring system of claim 1, wherein the weight instrument is configured for installation with at least one paddle of a plurality of paddles of the harvester elevator.

5. The dynamic yield monitor system of claim 4, wherein the paddle mounted weight instrument is configured to measure the harvested crop weight along an ascending segment of the harvester elevator, and a quantity of the harvest crop weighed on a paddle is static relative to the weight instrument and ascending relative to the remainder of an elevator loop of the harvester elevator.

6. The dynamic yield monitor system of claim 1, wherein the receiver and processing node includes a blending filter configured to determine the variable harvested crop test weight based on the measured harvested crop volume, weight, temperature and moisture as each of the plurality of harvested crop characteristics vary within a field.

7. The dynamic yield monitor system of claim 1, wherein the receiver and processing note includes a blending filter configured to:
   receive the measurements of the harvested crop characteristics including the measured harvest crop volume, weight, and a harvested crop temperature and a harvested crop moisture content, and
   generate one or more variable yield values based on the measurements of the harvested crop characteristics, the one or more variable yield values including one or more of a variable volume value, a variable weight value or a variable test weight value.

8. The dynamic yield monitor system of claim 7, wherein the receiver and processing node includes an indexing module in communication with a location sensor, and the receiver and processing node is configured to associate one or more of the variable yield values with a plurality of corresponding locations of an agricultural field.

9. The dynamic yield monitor system of claim 8, wherein the receiver and processing node includes a yield map module in communication with the indexing module, and the yield map module is configured to generate a yield map including one or more of the variable yield values associated with the plurality of corresponding locations of the agricultural field.

10. The dynamic yield monitoring system of claim 1 comprising the harvester elevator including an ascending segment and one or more paddles movable within the ascending segment and configured to move the harvested crop.

11. A harvester elevator comprising:
   a harvester elevator including at least an ascending segment and one or more paddles configured to move through the ascending segment;
   a volume instrument coupled with the harvester elevator;

a weight instrument coupled with the harvester elevator;
wherein the volume or weight instrument is movable relative to the other of the weight or volume instrument;
a moisture and temperature instrument, the moisture and temperature instrument is configured to measure a harvested crop moisture and temperature from the harvested crop within the harvester elevator; and
a receiver and processing node in communication with each of the volume and weight instruments, the receiver and processing node is configured to:
determine a variable harvested crop test weight of a harvested crop according to measurements of the volume and weight instruments in the ascending segment of the harvester elevator and moisture and temperature measurements of the harvested crop within the harvester elevator, and
determine a variable yield of the harvested crop according to measurements of the volume and weight instruments in the ascending segment, the moisture and temperature measurements and the determined variable harvested crop test weight.

12. The harvester elevator of claim 11, wherein the volume instruments coupled with a first portion of the harvester elevator and the weight instrument is coupled with a second portion of the harvester elevator different than the first portion.

13. The harvester elevator of claim 11, wherein the volume instrument is statically coupled along the ascending segment, and the weight instrument is configured to move relative to the volume instrument.

14. The harvester elevator of claim 11, wherein weight instrument is coupled with at least one paddle of the one or more paddles.

15. The harvester elevator of claim 14, wherein the weight instrument coupled with the at least one paddle is configured to measure the harvested crop weight along the ascending segment, and a quantity of the harvest crop weighed on the at least one paddle is static relative to the weight instrument and moving relative to the remainder of an elevator loop of the harvester elevator.

16. The harvester elevator of claim 11, wherein the weight instrument includes a plurality of weight instruments and the one or more paddles include a plurality of paddles, and each of the weight instruments is coupled with a respective paddle of the plurality of paddles.

17. The harvester elevator of claim 11, wherein the volume instrument includes an optical sensor.

18. The harvester elevator of claim 17, wherein the weight instrument includes a load cell.

19. The harvester elevator of claim 11, wherein the receiver and processing node includes an indexing module in communication with a location sensor, and the receiver and processing node is configured to associate one or more of the variable yield values with a plurality of corresponding locations of an agricultural field.

20. The harvester elevator of claim 19, wherein the receiver and processing node includes a yield map module in communication with the indexing module, and the yield map module is configured to generate a yield map including one or more of the variable yield values associated with the plurality of corresponding locations of the agricultural field.

21. A method for dynamically measuring yield comprising:
elevating a harvested crop within an ascending segment of a harvester elevator;
measuring a harvested crop volume of the harvested crop within the ascending segment;
measuring a harvested crop weight of the moving flow of the harvested crop within the ascending segment; and
determining one or more variable yield values of the harvested crop, generating including:
determining a variable harvested crop test weight of the harvested crop based on at least the measured harvested crop volume and weight, a harvested crop temperature and a harvested crop moisture at differing locations in a field; and
generating the one or more variable yield values based on the measurements of the harvested crop characteristics including at least the measured harvested crop volume and weight and the determined variable harvested crop test weight.

22. The method of claim 21, wherein elevating the harvested crop includes elevating the harvested crop on one or more paddles configured to move along the ascending segment.

23. The method of claim 21, wherein measuring the harvested crop volume includes optically measuring the harvested crop volume within the ascending segment.

24. The method of claim 21, wherein measuring the harvested crop weight includes weighing the harvested with a weight sensor installed on one or more paddles configured to move along the ascending segment.

25. The method of claim 21, wherein measuring the harvested crop volume includes measuring the harvested crop volume with a volume instrument in a first portion of the ascending segment, and measuring the harvested crop weight includes measuring the harvested crop weight with a weight instrument in a second portion of the ascending segment different than the first portion.

26. The method of claim 21, wherein measuring the harvested crop weight includes holding the harvested crop static relative to a weight instrument as the harvested crop and the weight instrument are elevating in the ascending segment.

27. The method of claim 21, wherein:
measuring the harvested crop volume includes measuring a first harvested crop volume corresponding to a first field location and measuring a second harvested crop volume corresponding to a second field location,
measuring the harvested crop weight includes measuring a first harvested crop weight corresponding to the first field location and measuring a second harvested crop weight corresponding to the second field location, and
determining the variable harvested crop test weight includes determining a first harvested crop test weight based on the first harvested crop volume and weight and determining a second harvested crop test weight based on the second harvested crop volume and weight.

28. The method of claim 21, wherein the one or more variable yield values includes a plurality of variable yield values, and
generating the one or more variable yield values includes generating the plurality of variable yield values, each of the variable yield values having a different value varying based on variations in at least a weight and volume of the harvested crop within a field.

29. The method of claim 21 comprising generating a yield map including one or more of the variable yield values associated with a plurality of corresponding locations of an agricultural field.

30. The method of claim 21, comprising measuring a harvested crop moisture content and temperature of the harvested crop within the harvester elevator.

* * * * *